July 23, 1935.　　　G. P. IGLEHEART　　　2,008,828
WIREBOUND BOX BLANK MACHINE
Filed April 10, 1933　　　8 Sheets-Sheet 1

INVENTOR.
George P. Igleheart
BY Blair, Curtis + Dunne
ATTORNEYS.

July 23, 1935.   G. P. IGLEHEART   2,008,828
WIREBOUND BOX BLANK MACHINE
Filed April 10, 1933   8 Sheets-Sheet 2

INVENTOR.
George P. Igleheart
BY Blair, Curtis + Dunne
ATTORNEYS.

Fig-3

July 23, 1935.　　　G. P. IGLEHEART　　　2,008,828
WIREBOUND BOX BLANK MACHINE
Filed April 10, 1933　　　8 Sheets-Sheet 4

INVENTOR.
George P. Igleheart
BY Blair, Curtis & Dunne
ATTORNEYS.

July 23, 1935.  G. P. IGLEHEART  2,008,828
WIREBOUND BOX BLANK MACHINE
Filed April 10, 1933  8 Sheets-Sheet 6

INVENTOR.
George P. Igleheart
BY Blair, Curtis & Dunne
ATTORNEYS.

Patented July 23, 1935

2,008,828

UNITED STATES PATENT OFFICE 2,008,828

WIREBOUND BOX BLANK MACHINE

George P. Igleheart, Boonton, N. J., assignor to Stapling Machines Co., a corporation of Delaware Application April 10, 1933, Serial No. 665,293

9 Claims. (Cl. 1—8.3)

This invention relates to machines and methods for making wirebound boxes and crates and particularly to wirebound box blank machines which staple binding wire to box sections for connecting the sections in foldable relationship.

It is an object of the invention to provide a machine and method for making a box blank which will fold into the form of a container adapted to nest with another container of the same size and shape.

It is a further object of the invention to provide a machine for connecting adjacent box sections with binding wire and having provision for relatively shifting adjacent sections or parts thereof during the wire applying operation.

It is a further object of the invention to provide a machine in which box sections are fed to stapling mechanism by parallel conveyors and in which one of the conveyors is rendered ineffective at certain times to change the spaced relationship between adjacent sections of the work.

One illustrative machine and method is disclosed in the accompanying drawings, in which:—

As conducive to a better understanding of this invention it may be noted at this point that it has been the practice heretofore in the manufacture of wirebound foldable box blanks to position the cleats and side sheets of the several sections in foldable relationship on parallel conveyor chains which convey the sections so positioned beneath stapling mechanism which staples binding wires to the foldably related sections to produce a box blank which will fold into box form and which when folded, will tension the binding wires over the box corners. Because the box sections are positioned and fed to the staplers on parallel conveyors, only sections of rectangular form could be handled by such machines, and the blanks produced on such machines when folded formed boxes of equal inside dimensions at the top and bottom. As a result, such machines could not be used to make wirebound foldable box blanks which would fold into the form of a nesting container.

Applicant's invention is intended to provide a machine and method which permits the assembling and feeding on parallel conveyors of box blank sections which are narrower at one end than at the other to produce a foldable wirebound blank which will fold into the form of a nesting container with the wires properly tensioned at the corners of the container.

Figures 1, 16:
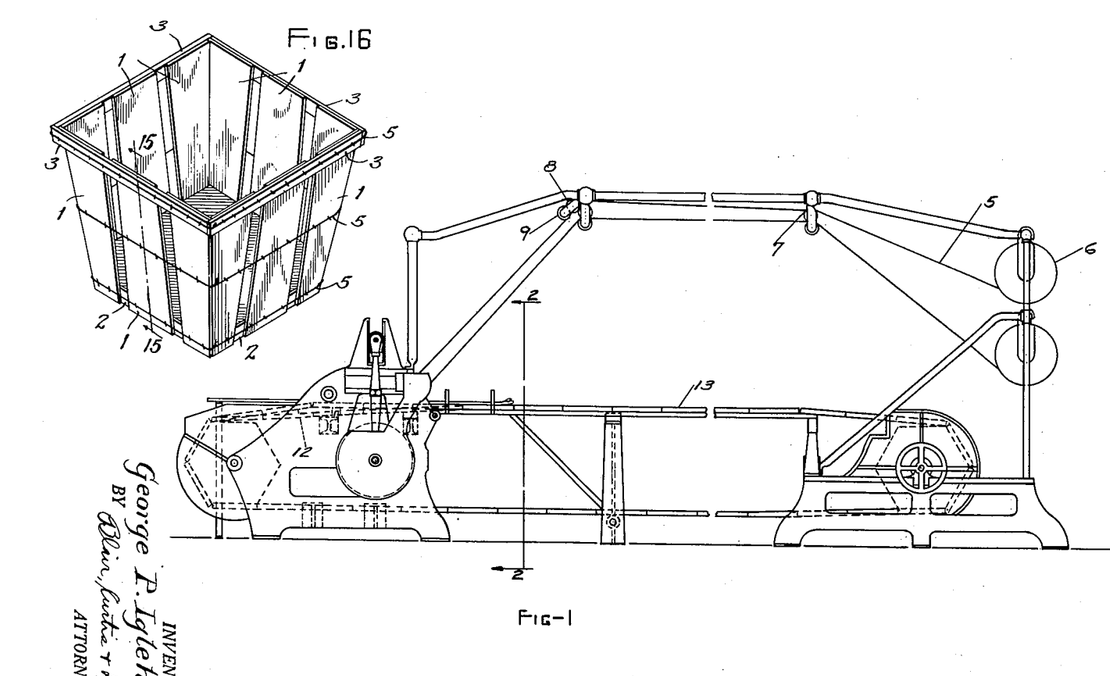
Figure 1 is a side elevation of a wirebound box blank machine embodying the invention.
Fig. 16 is an isometric perspective of a complete container.
Figure 2:
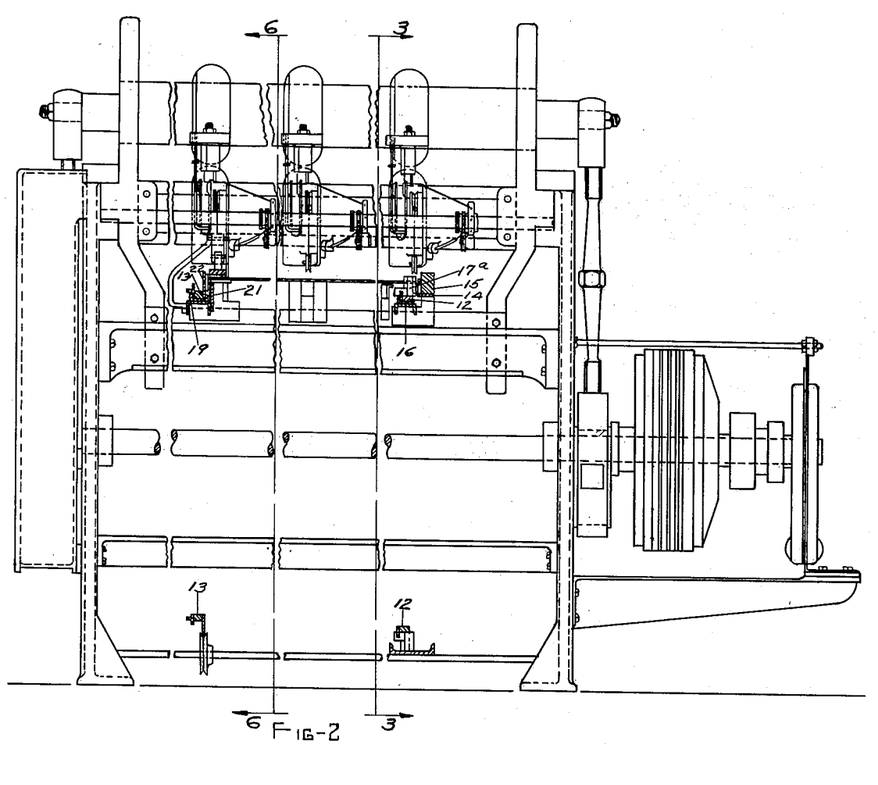
Fig. 2 is an enlarged section taken on the line 2—2 of Fig. 1.
Figures 13, 14, 15:
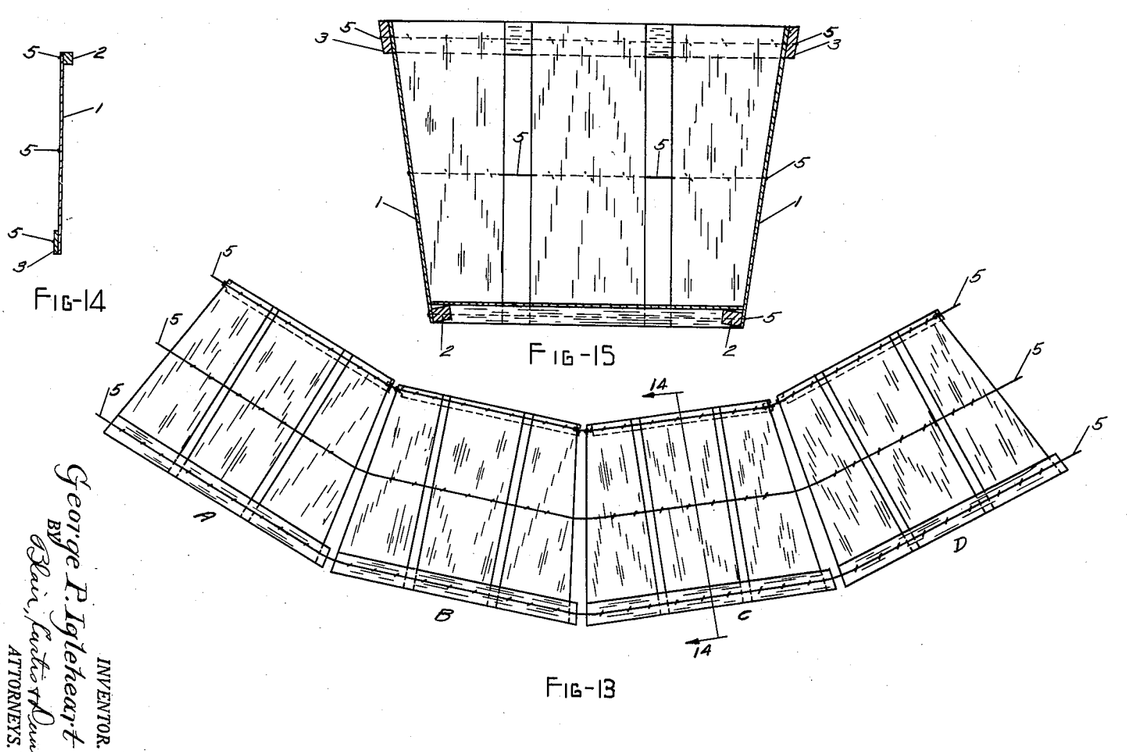
Fig. 13 is a top plan view of a completed wirebound crate blank produced on the machine.
Fig. 14 is a section taken on the line 14—14 of Fig. 13.
Fig. 15 is a vertical cross-section of a container formed by folding the blank of Fig. 13 into container form; said view being taken on the line 15—15 of Fig. 16.

In Fig. 13 is shown a wirebound foldable box blank which will fold into the form of nesting container shown in Fig. 16. The blank of Fig. 13, which is the product of the machine and method of this invention comprises four separate sections designated generally by the reference characters A, B, C and D. Each section consists of a sheet or sheets of side material 1, narrower at one end than at the other, an inner cleat 2 at the narrow end of the section, and an outer cleat 3 at the broad end of the section, the section as a whole being narrower at one end than at the other, as shown. The several sections of the blank are connected together in foldable relationship by binding wires 5 stapled thereto. When the blank is folded, the resulting structure will have the form shown in Fig. 16 and each wire will be tensioned over the box corners. As shown in Fig. 16, the sides of the container taper outwardly from the bottom to the top of the container, thus making it possible to nest containers of the same size and shape.

In Fig. 1 is shown a box blank machine embodying the invention. The stapling mechanism and the mechanism for moving the conveyor chains thereto are well known in the art and need not be described in detail herein. A detailed description of such mechanisms is given, for example, in patent to Thompson No. 1,738,806, dated December 10, 1929, reference to which is hereby made. It is sufficient to point out here that the box sections are assembled on parallel guides or conveyor chains and are conveyed beneath stapling mechanism which operates to form staples from staple stock wire fed thereto and drive the staples over binding wire into the box sections. As the wired blanks leave the stapling mechanism, the wires between blanks are severed by automatic cutters and the completed blanks are removed from the machine.

As shown in Fig. 1, the binding wire 5 is carried by a reel 6, passes over a roller 7 and then over tension rollers 8 and 9 (see Fig. 5), thence over tension rollers 10 and 11 carried by the stapler body (see Fig. 4) and is carried along with the work by reason of its attachment thereto by the staples. Thus the binding wires 5, of which there may be several, are laid upon and across the box sections as the sections are fed beneath the stapling mechanism, the wires being pulled from their reels and over the tension rollers by reason of their attachment to that part of the section which has passed beyond the stapling plane.

To produce a box blank which will fold into box form and properly tension each wire over the box corner in the folding operation, each section must be properly spaced from the preceding section when the first staple is driven over the binding wire into the section.

Figures 7, 8, 10:
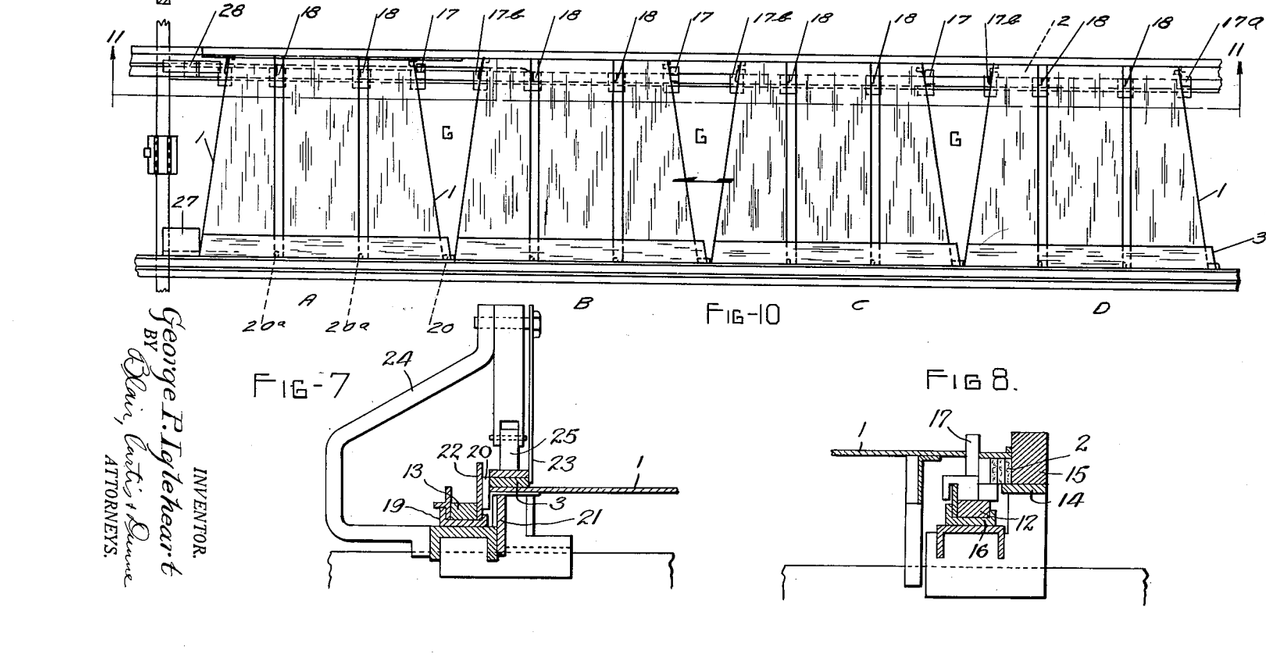
Fig. 7 is an enlarged cross-section of one of the work conveyor chains and associated parts, said view being taken on the line 7—7 of Fig. 6.
Fig. 8 is an enlarged cross-section of the other conveyor chain and its associated parts, said view being taken on the line 8—8 of Fig. 3.
Fig. 10 is an enlarged top plan view of the two conveyor chains and associated parts and showing materials for a crate blank positioned on the conveyors for presentation to the stapling mechanism.

As shown in Fig. 10, the several sections of the blank are positioned on parallel conveyors 12 and 13 with the broad end of the sections, including the outer cleats, in foldable relationship and with the narrow ends of the sections, including the inner cleats, in widely spaced relationship, leaving a fan-shaped gap G between sections.

As shown in Fig. 8, the inner cleats 2 rest upon a stationary support 14 having an outer flange 15 to prevent lateral movement of the cleat in one direction. The side sheet 1 rests upon the inner cleat 2 and abuts against the outer flange 15 of the support 14. The conveyor 12 travels in and is supported by a channel 16. The side sheet 1 and the cleat 2 are positioned and pushed by blocks 17 carried by the conveyor 12 and which extend over above the cleat support 14 a sufficient distance to engage the rear end of the cleat. The forward edge of each section is positioned by a block 17b (see Fig. 10). When slatted side material for a box section is employed, as shown, additional spacer blocks 18 (see Fig. 10) are interposed between the slats and are secured to the conveyor chain 12 to properly space one slat from the other on the conveyor chain 12.

Referring now to Fig. 7, the conveyor chain 13 travels in a channel guide 19 and carried lugs or spacer blocks 20 which space and propel the side sheets 1 and outer cleats 3. Intermediate sheet spacers 20a are provided for slatted side material. Sheets 1 at that side of the machine rest upon a stationary support 21 lying inside the conveyor chain 13. Sheets 1 and outer cleats 3 are held against lateral movement in one direction by a flange 22 of conveyor chain 13, and cleat 3 is held against lateral movement in the other direction by an arm 23 carried by a bracket 24 secured to the side of channel support 19. Secured to bracket 24 is a presser bar 25 to hold the outer cleat 3 down upon the sheet 1.

Figure 9:
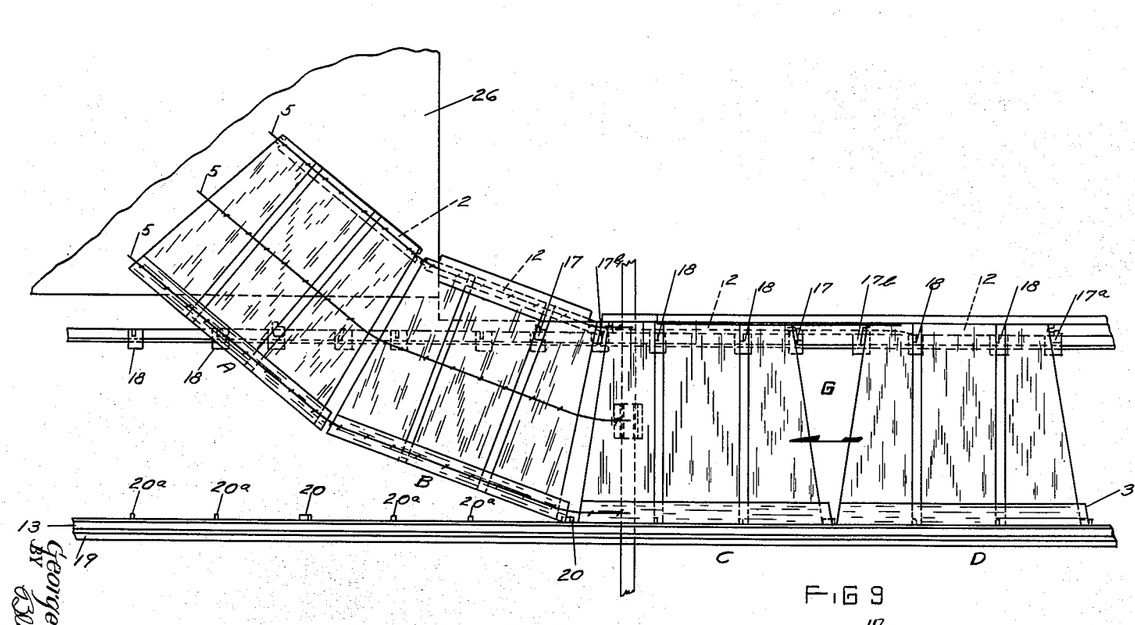
Fig. 9 is a cross-section of the same conveyor chain shown in Fig. 8, but taken on the line 9—9 of Fig. 3.
Figure 11:
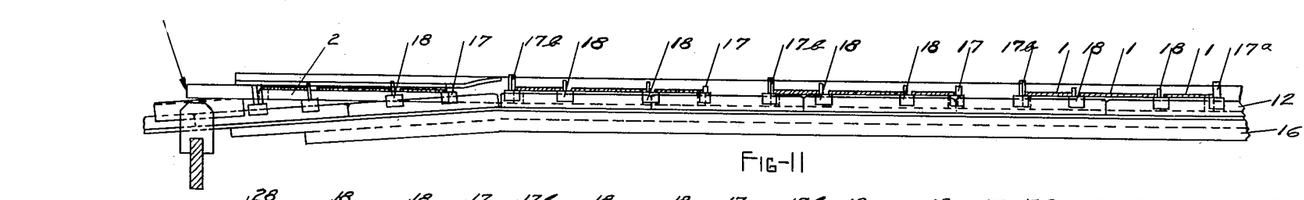
Fig. 11 is a section taken on the line 11—11 of Fig. 10.

Referring to Fig. 8 or 9, the support 14 for the inner cleats 2 and the flange 15 of the support 14 terminate just beyond the stapling plane, the position of which is indicated by the arrow in Fig. 11, thus permitting the wired sections of the blank to be swung at an angle to the course of travel of the conveyor chains after they have passed the stapling plane.

Figure 3:
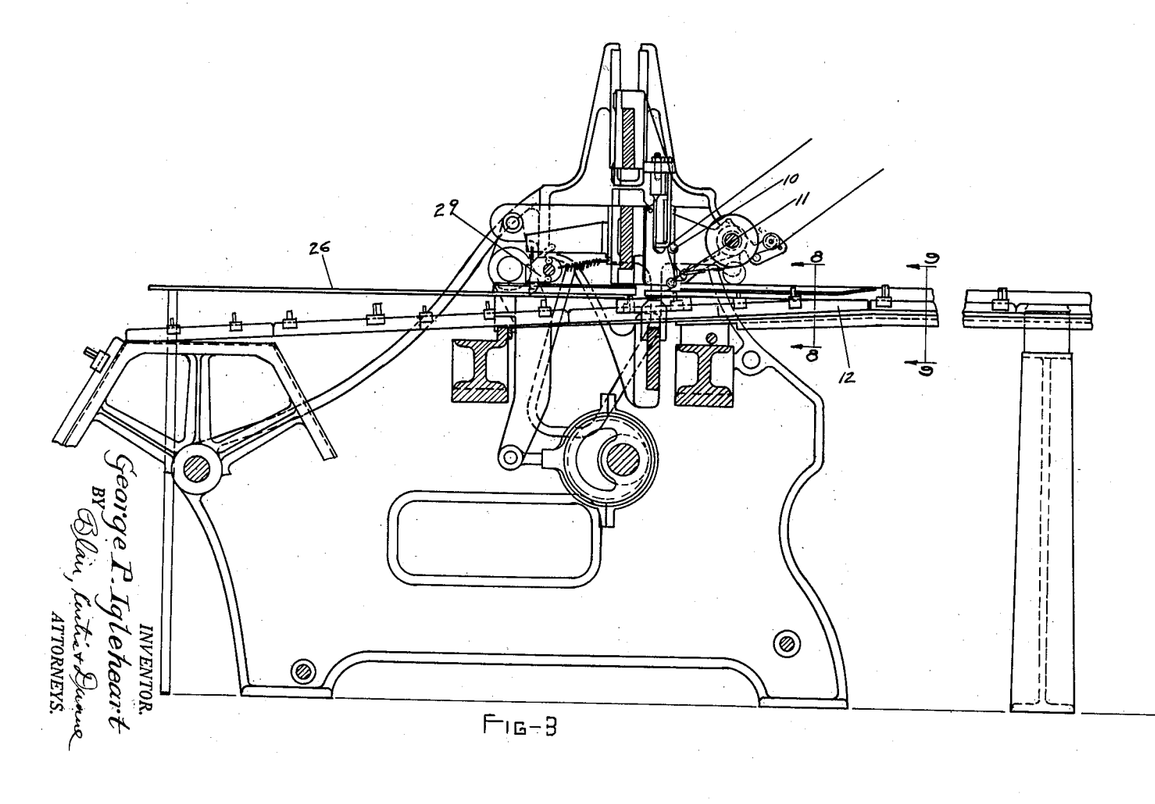
Fig. 3 is a sectional view taken on the line 3—3 of Fig. 2.
Figures 4, 5:
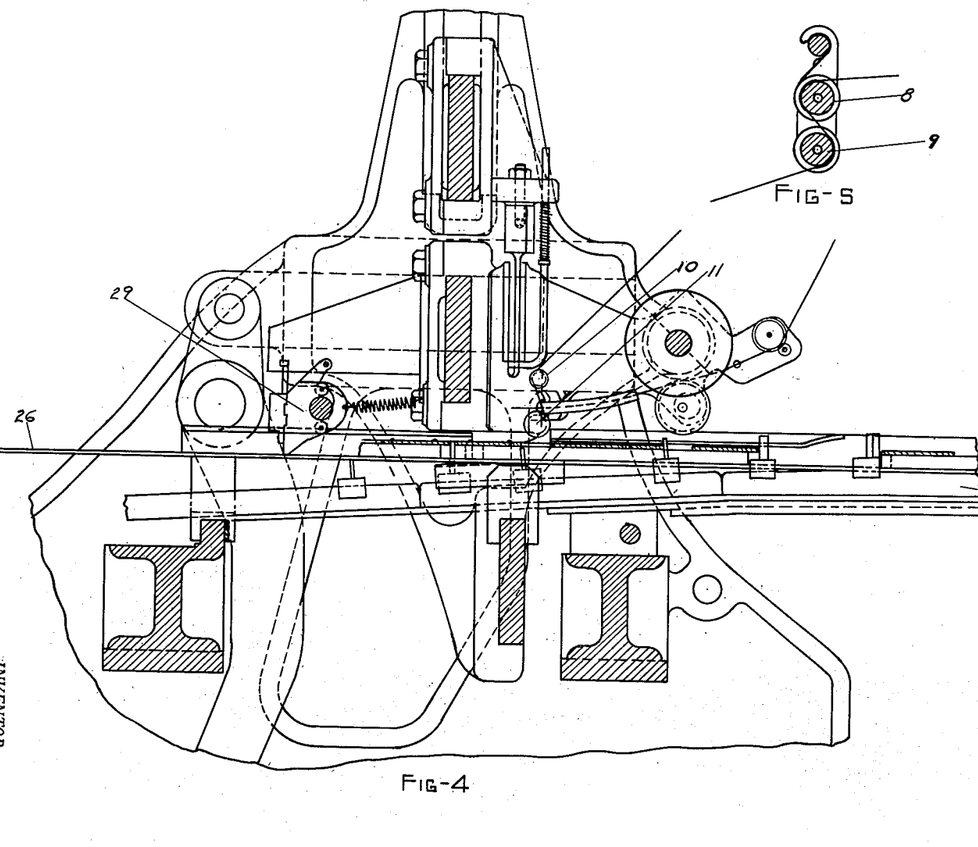
Fig. 4 is an enlarged view of the upper part of Fig. 3 and showing box blank materials being operated upon by the stapling mechanism.
Fig. 5 is an enlarged sectional view of the tension rollers over which the binding wire passes in its travel to the stapling mechanism.
Figure 6:
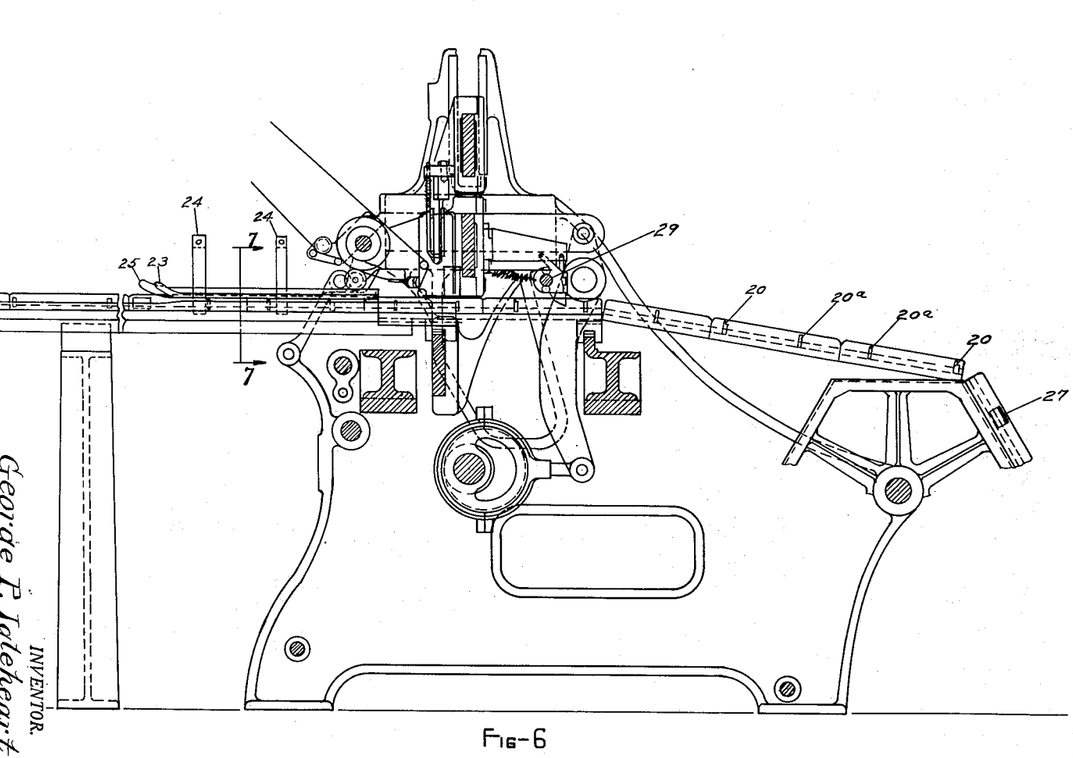
Fig. 6 is a sectional view taken on the line 6—6 of Fig. 2.

Referring to Figs. 3, 4 and 11, it will be noted that conveyor chain 12 and its supporting channel 16 incline downwardly from a point a short distance in front of the stapling mechanism. This downward incline of the conveyor chain 12 is such that the blocks 17 and 18 which position the sheets and cleats at the narrow end of the section are lowered out of contact with the sheets and cleats just after the last staple has been driven into that end of the section, thus permitting the chain 12 and the blocks 17 and 18 to continue their forward movement without advancing that end of the section. The block 17b is higher than the blocks 17 and 18 so that it will remain longer in contact with the section for a purpose hereinafter explained.

As shown in Fig. 1, however, the conveyor chain 13 at the other side of the machine is not inclined downwardly during its passage beneath the stapling mechanism, and as a result the blocks 20 and 20a on the conveyor 13 continue to feed the broad end of the section after the blocks 17 have been released from engagement with the narrow end of the section.

When the blocks 17 have been released from engagement with the sheets 1 and cleats 2, further movement of the narrow end of the section is prevented by the back pull of the binding wire which has been stapled to the section. The back pull of the wire is regulated by tension rollers 8 and 9 (see Fig. 5) to provide the requisite amount of back pull and to prevent further movement of that end of the section.

Figure 12:
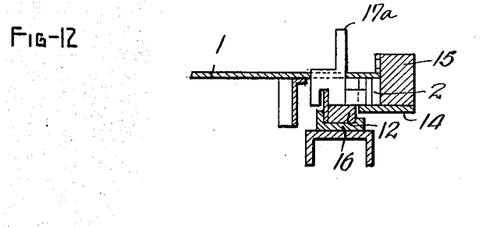
Fig. 12 is a top plan view of the conveyor chains and showing how a wired section is drawn into foldable relationship with the next following section after it passes the stapling plane.

With one end of the section held by the back pull of the binding wire, and the other end of the section continuing to move, the section pivots in the manner shown in Fig. 12 until the end of the inner cleat 2 is contacted by spacer block 17b, thus closing the V-shaped gap G (except for the space provided by the block 17b) and bringing the oncoming section into foldable relationship with the preceding section. When the gap is thus closed by the oncoming section, all parts of the two sections are then in foldable relationship and the first staple driven into the narrow end of the oncoming section perpetuates that relationship by connecting the two sections with the wire. The lock 17b which is of greater height than the block 17, maintains the proper foldable relationship between the sections until that relationship is perpetuated by the driving of one or more staples into the oncoming section.

As shown in Fig. 12, when the wired sections are swung at an angle to the line of travel of the conveyor chains and are pushed forward by the blocks 17ᵇ and 20, they pass onto a table support 26.

Referring to Fig. 11, it will be noted that a block 17ᵃ of greater height than the blocks 17 and 17ᵇ is located at the rear edge of the last section of the box blank (i. e., the fourth section of the illustrative blank). This high block 17ᵃ serves to maintain a space between box blanks until the wire has been stapled to the first section of the oncoming blank; the purpose being to provide the necessary length of tie wire between blanks which may be severed by the automatic cutter shown at 29 in Figs. 3 and 4. The cutter may be operated by blocks 27 and 28 secured respectively to conveyor chains 13 and 12 in the space between blanks.

The operation of the machine is thought to be clear from the description heretofore given. The several sections of the blank are positioned on the parallel conveyor chains with the V-shaped gaps between sections and are fed forward to the stapling point by spacer blocks or pusher blocks carried by the conveyors. After the last staple has been driven in the narrow end of the section, the pusher blocks are withdrawn from that end of the section while the pusher blocks at the other end of the section continue to move that end of the section. The binding wire on the end which has been released from engagement with the pusher blocks holds that end against further forward movement until the fan-shaped gap is closed (except for the space occupied by the blocks 17ᵇ and 20) whereupon the spacer blocks 17ᵇ and 20 push the wired section before them and out onto the receiving table 26. When the gap between sections (except for the spacing provided by the spacer blocks) is closed, staples are driven into the oncoming section, perpetuating the foldable relationship between the two sections. A completed blank in the form shown in Fig. 13 emerges from the machine. When folded it produces the wirebound nesting container shown in Fig. 16 with the wires tensioned over the corners.

Referring to Fig. 12, it will be noted that the wider end of each section of the blank receives more staples than the narrower end. This results from the fact that certain of the staples driven by the stapler located above the narrow ends are driven while the fan-shaped openings lie beneath the stapler and therefore do not enter the narrow end of the section.

It will be understood that the invention is not to be limited to the particular embodiment shown for purposes of illustration, as it may be variously embodied without departing from the invention. It will also be understood that all of the features of the invention need not be used conjointly, as they may be embodied in various combinations and sub-combinations as defined in the subjoined claims.

I claim:

1. A machine for making wire bound box blanks comprising, in combination, stapling mechanism to apply binding wire to box sections; parallel guides for the box sections; means to position on said guides a succession of box sections which are narrower at one end than at the other to provide fan-shaped openings between adjacent sections; means to feed said sections so positioned to the stapling mechanism; and means to render ineffective the feeding means at the narrow end of a section after the last staple has been driven into that end of the section to permit a succeeding section to close the space therebetween.

2. A machine for making wirebound box blanks comprising, in combination, stapling mechanism to apply binding wire to box sections; parallel guides for the box sections; means to position on said guides a succession of box sections which are narrower at one end than at the other to provide fan-shaped openings between adjacent sections; means to feed said sections so positioned to the stapling mechanism; and means to arrest the movement of the narrow end of a section while permitting continued movement of the wide end of the section to close the space between adjacent sections.

3. A machine for making wirebound box blanks comprising, in combination, stapling mechanism to apply binding wire to box sections; parallel guides for the box sections; means to position a plurality of box sections in spaced relationship on said guides; means to feed the sections to the stapling mechanism in the direction of said guides; and means to pivot a section about a point on one of said guides after the section has passed the stapling mechanism to vary the spacing between sections.

4. A machine for making wirebound box blanks comprising, in combination, stapling mechanism to apply binding wire to box sections; parallel guides for the box sections; means to position a plurality of box sections in spaced relationship on said guides; means to feed the sections to the stapling mechanism in the direction of said guides; and means to pivot a section about a point on one of said guides after the section has passed the stapling mechanism to vary the shape of the spaces between sections.

5. A machine for making wirebound box blanks comprising, in combination, stapling mechanism to apply binding wire to box sections; means to position a plurality of box sections with fan-shaped spaces between sections and to feed the sections in substantially a straight line to the stapling mechanism; and means to pivot a section at an angle to the straight line feed after it has passed the stapling mechanism to close the fan-shaped space between that section and the next following section.

6. A machine for making wirebound box blanks comprising, in combination, stapling mechanism to apply binding wire to box sections; means to position a plurality of box sections with fan-shaped spaces between sections and to feed the sections in substantially a straight line to the stapling mechanism; and means to pivot a section at an angle to the straight line feed after it has passed the stapling mechanism to vary the size of a fan-shaped opening.

7. A machine for making wirebound box blanks comprising, in combination, stapling mechanism to apply binding wire to box sections; parallel guides for the box sections; means operable adjacent each guide to feed the box sections to the stapling mechanism; and means rendering one of said feeding means ineffective at intervals to vary the relative position of adjacent sections.

8. The method of making a wirebound foldable box blank adapted to be folded into a nesting box which is characterized by assembling in the flat a plurality of side sections each narrower at one end than at the other end and positioned in alignment laterally and with their ends in parallelism to provide fan-shaped openings between sections, feeding the sections so positioned in substantially a straight line to binding wire applying mechanism, discontinuing the feed of the narrow end of a section after it has been wired while continuing the feed of the narrow end of the next succeeding section, whereby the fan-shaped opening between the sections will be closed prior to the attachment of the wire to the narrow end of the succeeding section.

9. The method of making a wirebound foldable container blank adapted to be folded into a nesting shipping container which is characterized by assembling in the flat a plurality of side sections each narrower at one end than at the other end with fan-shaped openings between sections, feeding the sections so positioned to stapling mechanism to apply binding wires to the successive sections, discontinuing the feed of the narrow end of a section after the binding wire has been stapled thereto while continuing the feed of the wide end of that section and of both the wide and narrow ends of the next succeeding section, whereby the fan-shaped openings between those sections will be closed prior to the attachment of the wire to the narrow end of the succeeding section.

GEORGE P. IGLEHEART.